United States Patent [19]

Bagrodia et al.

[11] Patent Number: 5,180,775
[45] Date of Patent: Jan. 19, 1993

[54] BLENDS OF COPOLY(ARYLENE SULFIDE) AND ETHYLENE-PROPYLENE RUBBER

[75] Inventors: Shriram Bagrodia; David R. Fagerburg; Steven Gedon; Joseph J. Watkins; Paul B. Lawrence; Mark Rule, all of Kingsport, Tenn.

[73] Assignee: Eastman Kodak Company, Rochester, N.Y.

[21] Appl. No.: 819,696

[22] Filed: Jan. 13, 1992

Related U.S. Application Data

[63] Continuation-in-part of Ser. No. 753,536, Sep. 3, 1991, abandoned.

[51] Int. Cl.⁵ .................. C08L 81/00; C08G 62/48
[52] U.S. Cl. .................. 525/64; 525/189; 525/537
[58] Field of Search .................. 525/189, 537, 64

[56] References Cited

U.S. PATENT DOCUMENTS

| | | | |
|---|---|---|---|
| 2,513,188 | 6/1950 | Macallum | 528/388 |
| 2,538,941 | 1/1951 | Macallum | 528/388 |
| 4,581,411 | 4/1986 | Liang et al. | 525/189 |
| 4,786,713 | 11/1988 | Rule et al. | 528/389 |
| 4,792,600 | 12/1988 | Rule et al. | 528/389 |
| 4,855,393 | 8/1989 | Rule et al. | 528/389 |
| 4,888,390 | 12/1989 | Liang et al. | 525/189 |

FOREIGN PATENT DOCUMENTS 1148269 7/1986 Japan .

OTHER PUBLICATIONS

Encyclopedia of Polymer Science & Technology, vol. 6, pp. 522–526.

Primary Examiner—John C. Bleutge
Assistant Examiner—Helen F. Lee
Attorney, Agent, or Firm—Charles R. Martin; William P. Heath, Jr.

[57] ABSTRACT

Disclosed is a composition comprising
(A) from 99.9 to 60 weight percent, based on the weight of the composition, of a copoly(arylene sulfide) and
(B) from 0.1 to 40 weight percent, based on the weight of the composition, of an ethylene-propylene rubber.

4 Claims, No Drawings

BLENDS OF COPOLY(ARYLENE SULFIDE) AND ETHYLENE-PROPYLENE RUBBER

This application is a continuation-in-part of Ser. No. 07/753,536 filed Sep. 3, 1991 now abandoned.

This invention relates to compositions comprised of a copoly(arylene sulfide) and ethylene-propylene rubbers.

Poly(arylene sulfide) resins are thermoplastic polymeric materials with good thermal stability, unusual insolubility, resistance to chemical environments and inherent flame resistance. Poly(arylene sulfide) resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment. These polymers can be prepared by reacting p-dichloro-benzene with sodium sulfide in a polar organic solvent to produce poly(phenylene sulfide) and the by-product sodium chloride in accordance with U.S. Pat. Nos. 2,513,188 and 2,538,941. An improvement on this procedure involves adding N-haloamides as catalysts.

Recently copoly(arylene sulfides) have been discovered. These polymers can be described as having repeating units corresponding to the structure

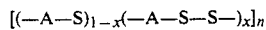
$$[(-A-S)_{1-x}(-A-S-S-)_x]_n$$

wherein x is in the range of 0.5 to 0.001, A is a divalent aromatic radical and n is at least 200 and is preferably in the range of 500 to 5,000.

It has now been discovered that copoly(arylene sulfide) can be blended with ethylene-propylene rubbers. This blend can be broadly described as a composition of (A) from 99.9 to 60 weight percent, based on the weight of the composition, of a copoly(arylene sulfide) corresponding to the structure

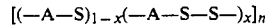
$$[(-A-S)_{1-x}(-A-S-S-)_x]_n$$

wherein A is a divalent substituted or unsubstituted aromatic radical, x is in the range of 0.5 to 0.001 and n is at least 25, and (B) from 0.1 to 40 weight percent, based on the weight of the composition, of an ethylene-propylene rubber.

Blends of poly(arylene sulfides) and ethylene-propylene rubbers are disclosed in U.S. Pat. Nos. 4,581,411 and 4,888,390.

The copoly(arylene sulfide) polymers useful in this invention are identical to the copoly(arylene sulfide) polymers disclosed in U.S. Pat. Nos. 4,786,713 and 4,855,393, herein incorporated by reference, except that the minimum value of n of the copoly(arylene sulfide) polymers useful in this invention is lower than the minimum value of n for the copoly(arylene sulfide) polymers which is disclosed in these references. The copoly(arylene sulfide) polymers useful in this invention are therefore inherent in the disclosure of these references because as the molecular weight builds up toward the minimum value of n of at least 200 which is disclosed in these references the molecular weight passes through a molecular weight associated with the lower minimum value of n of 25 of the copoly(arylene sulfide) polymers of this invention. The copoly(arylene sulfide) polymers useful in this invention can be prepared by those skilled in the art by following the teachings of these references and controlling the stoichiometry, time, temperature and other variables of the reaction to achieve a molecular weight associated with a value of n which is at least 25.

The diiodoaromatic compounds which can be utilized to prepare the copoly(arylene sulfide) useful in this invention, include unsubstituted or substituted aromatics which have two iodine substituents. Preferred diiodoaromatic compounds are the diiodobenzenes, diiodonaphthalenes and diiodobiphenyls which may be unsubstituted or substituted. More preferably the diiodoaromatic compounds suitable for the present invention include p-diiodobenzene, m-diiodobenzene, p,p'-diiodobiphenyl, p,p'-diiodobiphenyl, p,p'-diiododiphenyl ether and 2,6-diiodonaphthalene. Most preferably the diiodo compound is p-diiodobenzene.

In the embodiment of the invention wherein the composition is partially crosslinked, the disulfide content of the copoly(arylene sulfide) is in the range of 50 to 5 mole percent and therefore the value of x is on the range of 0.5 to 0.05.

The compositions of this invention contain an ethylene-propylene rubber. By the term "ethylene-propylene rubber" we mean an elastomeric polymer which contains specific ranges of units derived from ethylene and propylene. The ethylene-propylene rubbers useful in this invention broadly have an amount of ethylene in the range of 40 to 90 mole percent and an amount of propylene in the range of 60 to 10 mole percent, based on the total moles of ethylene and propylene. In a preferred embodiment the ethylene-propylene rubbers have an amount of ethylene in the range of 50 to 75 mole percent and an amount of propylene in the range of 50 to 25 mole percent, based on the total moles of ethylene and propylene.

In one embodiment of the invention the ethylene-propylene rubber can contain one or more other repeating units which are not functionalized with a double bond capable of reacting with the disulfide linkages of the copoly(arylene sulfide) to result in some degree of crosslinking. Examples of such ethylene-propylene rubbers are polymers composed of 55% ethylene, 44.35% propylene and 0.65% maleic anhydride, 77% ethylene, 22.65% propylene and 0.35% maleic anhydride and 65% ethylene, 34.1% propylene and 0.9% maleic anhydride. The ethylene-propylene rubbers useful in this invention are well known in the art and are described in Encyclopedia of Polymer Science & Engineering, Volume 6, Pages 522 to 526. In this embodiment of the invention there is no substantial amount of crosslinking between the two polymers and the compositions are therefore admixtures.

In another embodiment of the invention the ethylene-propylene rubber can contain one or more other repeating units which are functionalized with a double bond capable of reacting with the disulfide linkages of the copoly(arylene sulfide) to result in some degree of crosslinking. Examples of such ethylene-propylene rubbers are polymers composed of 45% ethylene, 45% propylene and 10% 5-ethylidene-2-norbornene, 64% ethylene, 31% propylene and 5% 1,4-hexadiene and 58% ethylene, 35.6% propylene and 6.4% 5-ethylidene-2-norbornene. The ethylene-propylene rubbers useful in this embodiment of the invention are well known in the art and are described in Encyclopedia of Polymer Science & Engineering, Volume 6, Pages 522 to 526 and U.S. Pat. No. 4,581,411. In this embodiment of the invention there is some crosslinking between the copoly-(arylene sulfide) and the ethylene-propylene rubber and the compositions are therefore not admixtures of the two polymers.

In this invention the average molecular weight of the ethylene-propylene rubber is at least 5,000 preferably at least 20,000 as measured by gel permeation chromatography.

The compositions of this invention can be prepared by known techniques for blending polymers. For example, the polymers can be coextruded in convention twin screw extrusion equipment. Also, powders of both polymers may be admixed and the admixed powders extruded in a single screw extruder. Preferably, an admixture of powdered polymer is prepared and the admixture powder is extruded in a single screw extruder.

The amount of copoly(arylene sulfide) is in the range of 99.1 to 60 weight percent, preferably 99.5 to 80 weight percent, and more preferably 99 to 85 weight percent, based on the weight of the composition. The amount of ethylene-propylene rubber is in the range of 0.1 to 40 weight percent, preferably 0.5 to 20 weight percent, and more preferably 1 to 15 weight percent, based on the weight of the composition.

The compositions of this invention can be used for preparation of various shaped articles such as pellets, fibers and molded articles. The polymer can be prepared into these shaped articles by conventional processes, such as injection molding, melt spinning, and melt extrusion.

The compositions of this invention can additionally contain fillers, nucleating agents and reinforcing materials in the form of fibers, minerals, powders or mats. For example, the compositions can contain glass fibers, aluminum oxide, calcium oxide, silicon dioxide, Titanium dioxide, copper, kaolin, and the like.

The compositions of this invention are normally solid in the sense that at typical room temperatures and pressures the compositions are in a solid state as compared to a liquid state. The solid character of the composition results from both polymers having a sufficiently high molecular weight to be a solid.

The compositions of this invention are characterized by extremely desirable interfacial adhesion between the copoly(phenylene sulfide) and ethylene-propylene rubber. Interfacial adhesion is an important property of a composition of two polymers because it governs the strength of the blended material. When the interfacial adhesion is high, the compositions can withstand higher stress before failure for any given morphology.

The following examples are used to describe the invention and should be taken as illustrative and not restrictive.

EXAMPLE 1

This example illustrates the enhanced interfacial adhesion associated with a composition of the invention wherein the two polymers are an admixture.

A copoly(phenylene sulfide) was prepared by the melt phase reaction of sulfur and p-di-iodobenzene, as described in U.S. Pat. Nos. 4,786,713 and 4,792,600. The value of x was estimated to be about 0.10 as determined by elemental analysis. The melt viscosity of copoly(phenylene sulfide) at 300° C. at 25 Sec$^{-1}$ shear rate was about 5000 poise. Properties of the product included a melt viscosity of about 5000 poise at 300° C. and 25 rad/sec, a glass transition temperature of 89° C. and an estimated disulfide content of 10 mol percent.

An admixture was prepared which contained 95 weight percent of the copoly(phenylene sulfide) and 5 weight percent of an ethylene-propylene rubber containing about 55 weight percent ethylene units, about 45 weight percent propylene units and 0.65 maleic anhydride units. The ethylene-propylene rubber had a number-average molecular weight of about 54,000 as determined by gel permeation chromatography. The two polymers were cryogenically micropulverized to a particle size less than 1.0 mm. A physical blend of 0.75 g of the ethylene-propylene rubber and 14.25 g of copoly(phenylene sulfide) was made and well mixed. The powdered mixture of the above two polymers, 15 g by weight, was dried for at least 12 hours at 90° C. in a vacuum oven. The dried polymer mixture was melt extruded into a film at 550° F. The film was cryogenically fractured in liquid nitrogen and the fracture surface morphology was determined using a scanning electron microscope.

A scanning electron micrograph of the cryogenically fractured surface clearly shows good interfacial adhesion between the two phases.

EXAMPLE 2

This example illustrates the poor interfacial adhesion associated with a composition which is an admixture of poly(phenylene sulfide) and an ethylene-propylene rubber.

Example 1 was repeated except that a poly(phenylene sulfide) was used instead of the copoly(phenylene sulfide). The poly(phenylene sulfide) had a melt shear viscosity of about 11,700 poise at 300° C. and 25 sec$^{-1}$ shear rate.

A scanning electron photomicrograph of the fractured surface of the admixture clearly indicates very poor interfacial adhesion between the two phases.

EXAMPLE 3

This example illustrates a composition of the invention wherein the two polymers are an admixture.

Example 1 is repeated except that the amount of copoly(phenylene sulfide) is 75 weight percent and the amount of ethylene-propylene rubber is 25 weight percent.

The scanning electron micrograph of the cryogenically fractured surface clearly shows good interfacial adhesion between the two phases.

EXAMPLE 4

This example illustrates a composition of the invention wherein the two polymers are an admixture.

Example 1 is repeated except that the amount of copoly(phenylene sulfide) is 90 weight percent and the amount of ethylene-propylene rubber is 10 weight percent.

The scanning electron micrograph of the cryogenically fractured surface clearly shows good interfacial adhesion between the two phases.

EXAMPLE 5

This example illustrates the enhanced interfacial adhesion associated with compositions of this invention wherein the composition is an admixture of the two polymers.

A copoly(phenylene sulfide) was prepared as in example 1. An admixture was prepared which contained 95 weight percent of the copoly(phenylene sulfide) and 5 weight percent of an ethylene-propylene rubber containing about 55 weight percent ethylene units, about 45 weight percent propylene units. The ethylene-propylene rubber had a number-average molecular weight of about 54,000 as determined by gel permeation chromatography. The two polymers were cryogenically micropulverized to a particle size less than 1.0 mm. A physical blend of 0.75 g of the ethylene-propylene rubber and 14.25 g of copoly(phenylene sulfide) was made and well mixed. The powdered mixture of the above two polymers, 15 g by weight, was dried for at least 12 hours at 90° C. in a vacuum oven. The dried polymer mixture was melt extruded into a film at 550° F. The film was cryogenically fractured in liquid nitrogen and the fracture surface morphology was determined using a scanning electron microscope.

A scanning electron micrograph of the cryogenically fractured surface clearly shows good interfacial adhesion between the two phases.

EXAMPLE 6

This example illustrates the poor interfacial adhesion associated with a composition which is an admixture of poly(phenylene sulfide) and an ethylene-propylene rubber.

Example 5 was repeated except that a poly(phenylene sulfide) was used instead of the copoly(phenylene sulfide). The poly(phenylene sulfide) had a melt shear viscosity of about 11,700 poise at 300° C. and 25 sec$^{-1}$ shear rate.

A scanning electron photomicrograph of the fractured surface of the film clearly indicates very poor interfacial adhesion between the two phases.

EXAMPLE 7

This example illustrates a composition of the invention wherein the two polymers are an admixture.

Example 5 is repeated except that the amount of copoly(phenylene sulfide) is 98 weight percent and the amount of ethylene-propylene rubber is 2 weight percent.

The scanning electron micrograph of the cryogenically fractured surface clearly shows good interfacial adhesion between the two phases.

EXAMPLE 8

This example illustrates the poor interfacial adhesion associated with compositions which are admixtures of poly(phenylene sulfide) and an ethylene-propylene rubber.

Example 7 is repeated except that the poly(phenylene sulfide) used in example 6 is used in place of the copoly(phenylene sulfide).

The scanning electron micrograph of the cryogenically fractured surface clearly shows poor interfacial adhesion between the two phases.

EXAMPLE 9

This example illustrates a composition of this invention wherein there is some degree of crosslinking between the two polymers.

Example 5 is repeated except that the copoly(phenylene sulfide) had a greater amount of disulfide linkages, different amounts of the polymers were used and a different ethylene-propylene rubber was used. In this example the amount of disulfide linkages in the copoly(phenylene sulfide) was about 20 percent resulting in the value of x to be about 0.2. The ethylene-propylene rubber contains about 74 weight percent ethylene units, about 26 weight percent propylene units and about 5 weight percent 5-ethylidene-2-norbornene, based on the weight of the ethylene-propylene rubber. The ethylene-propylene rubber had a number-average molecular weight of about 54,000 as determined by gel permeation chromatography. The amount of copoly(phenylene sulfide) was 98 weight percent and the amount of ethylene-propylene rubber was 2 weight percent. A compression molded film was prepared from this composition at 280° C. A strip of this film was stirred in hot 1,2,3,4-tetrahydronaphthalene for 6 hours. 52 percent of the strip was insoluble. This confirms the crosslinked character of the composition.

EXAMPLE 10

This example illustrates the poor interfacial adhesion associated with a composition which is an admixture of poly(phenylene sulfide) and an ethylene-propylene rubber.

Example 9 was repeated except that a poly(phenylene sulfide) was used instead of the copoly(phenylene sulfide). The poly(phenylene sulfide) had a melt shear viscosity of about 11,700 poise at 300° C. and 25 sec$^{-1}$ shear rate.

A scanning electron photomicrograph of the fractured surface of the admixture clearly indicates very poor interfacial adhesion between the two phases.

EXAMPLE 11

This example illustrates a composition of this invention wherein there is crosslinking between the polymers.

Example 9 is repeated except that the amount of copoly(phenylene sulfide) was 0.5 weight percent and the amount of ethylene-propylene rubber was 99.5 weight percent. A strip of this film was stirred in hot 1,2,3,4-tetrahydronaphthalene for 6 hours. 50 percent of the strip was insoluble. This confirms that even a small amount of high disulfide linkage containing copoly(phenylene sulfide) results in a composition having crosslinking.

We claim:

1. A composition comprising
   (A) from 99.9 to 90 weight percent, based on the weight of the composition, of a copoly(arylene sulfide) corresponding to the structure

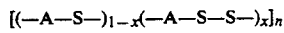

$$[(-A-S-)_{1-x}(-A-S-S-)_x]_n$$

wherein A is a divalent substituted or unsubstituted aromatic radical, x is in the range of 0.5 to 0.001 and n is at least 25, and
   (B) from 0.1 to 10 weight percent, based on the weight of the composition, of a maleated ethylene-propylene rubber having an amount of ethylene in the range of 40 to 90 mole percent and an amount of propylene in the range of 60 to 10 mole percent, based on the total moles of ethylene and propylene.

2. The composition of claim 1 wherein the divalent aromatic radical is provided by diiodobenzene, diiodonaphthalene or diiodobiphenyl.

3. The composition of claim 1 wherein the divalent aromatic radical is p-diiodobenzene, m-diiodobenzene, p,p'-diiodobiphenyl, p,p'-diiododiphenyl ether or 2,6-diiodonaphthalene.

4. A composition comprising (A) from 99 to 90 weight percent, based on the weight of the composition, of a copoly(phenylene sulfide) corresponding to the structure $$[(-A-S-)_{1-x}(-A-S-S-)_x]_n$$

wherein A is a divalent phenylene radical, x is in the range of 0.5 to 0.001 and n is at least 50, and (B) from 1 to 10 weight percent, based on the weight of the composition, of a maleated ethylene-propylene rubber having an amount of ethylene in the range of 50 to 75 mole percent and an amount of propylene in the range of 50 to 25 mole percent, based on the total moles of ethylene and propylene.

* * * * *